United States Patent [19]

Kuse

[11] Patent Number: 5,536,343

[45] Date of Patent: Jul. 16, 1996

[54] METHOD AND APPARATUS FOR MANUFACTURING SLIDE FASTENER CHAIN WITH SEPARABLE BOTTOM END STOP MEMBERS

[75] Inventor: Kazuki Kuse, Toyama, Japan

[73] Assignee: YKK Corporation, Tokyo, Japan

[21] Appl. No.: 298,171

[22] Filed: Aug. 30, 1994

[30] Foreign Application Priority Data

Sep. 8, 1993 [JP] Japan .................................. 5-222968

[51] Int. Cl.⁶ .............................. B32B 31/10; B29C 45/14
[52] U.S. Cl. ..................... 156/933; 156/201; 156/202; 156/252; 156/467; 156/510; 156/580.1; 264/154; 264/161; 264/229; 264/252; 264/273; 264/275; 264/278; 425/111; 425/121; 425/122; 425/145; 425/294; 425/545; 425/814
[58] Field of Search .................................. 425/121, 545, 425/111, 122, 129.1, 145, 294, 814; 264/252, 161, 154, 138, 40.7, 229, 273, 275, 278; 156/73.3, 73.4, 201, 202, 216, 361, 252, 467, 510, 580.1

[56] References Cited

U.S. PATENT DOCUMENTS

| | | | |
|---|---|---|---|
| 4,226,577 | 10/1980 | Sawada | 425/111 |
| 4,453,990 | 6/1984 | Takahashi | 156/216 |
| 4,455,274 | 6/1984 | Horney | 425/116 |
| 4,492,547 | 1/1985 | Nogal | 425/111 |
| 4,641,424 | 2/1987 | Sodeno et al. | 425/814 |
| 4,906,318 | 3/1990 | Miyazaki | 156/361 |
| 5,079,820 | 1/1992 | Mayerhofer | 425/545 |
| 5,231,737 | 8/1993 | Fröblich et al. | 24/434 |

FOREIGN PATENT DOCUMENTS

| | | |
|---|---|---|
| 0046903 | 3/1982 | European Pat. Off. . |
| 0092789 | 11/1983 | European Pat. Off. . |
| 0470351 | 2/1992 | European Pat. Off. . |
| 2383769 | 10/1978 | France . |
| 2835206 | 3/1979 | Germany ............................. 425/814 |
| 63-40085 | 8/1988 | Japan . |
| 1551535 | 8/1979 | United Kingdom . |
| 2059329 | 4/1981 | United Kingdom . |

OTHER PUBLICATIONS

English Abstract of Japanese application 60-44,315, Mar. 9, 1985.

*Primary Examiner*—Robert Davis
*Attorney, Agent, or Firm*—Hill, Steadman & Simpson

[57] ABSTRACT

In a method and apparatus for manufacturing a slide fastener chain having rows of coupling elements and members of a separable bottom end stop assembly, two positioning holes are formed at predetermined positions on reinforcing films attached to a pair of fastener tapes. The positioning holes are used to position the fastener tapes relative to a molding unit with respect to each individual slide fastener length. Thus, even when a positioning error is produced due to a change in tension on the fastener tapes being processed, such error is limited to a small extent which is created only in the individual slide fastener length. Thus, the coupling elements and the first pin member and the second pin member can be molded precisely. Additional to its primary positioning function, the positioning holes further have a function to provide a reference when a pair of U-shaped cutout portions is formed in the fastener tapes to facilitate smooth and reliable attachment of a box relative to the first pin member and the second pin member, and also have a function to provide a reference when the slide fastener chain is cut off at the cutout portions transversely across the fastener tapes.

12 Claims, 8 Drawing Sheets

METHOD AND APPARATUS FOR MANUFACTURING SLIDE FASTENER CHAIN WITH SEPARABLE BOTTOM END STOP MEMBERS

BACKGROUND OF THE INVENTION

1. Field of the Invention

The present invention relates to a method of and an apparatus for manufacturing a slide fastener chain with separable bottom end stop members (a first pin member for attaching a box and a second pin member), and a method of producing a slide fastener from the slide fastener chain. More particularly, this invention relates to a method which is capable of continuously manufacturing a plurality of longitudinally spaced slide fastener chains with high accuracy of positioning to cope with the production of slide fasteners of different lengths each having a separable bottom end stop assembly, a method of producing slide fasteners from the slide fastener chains, and an apparatus for carrying out the slide fastener chain manufacturing method.

2. Description of the Prior Art

A molding apparatus disclosed in British Patent No. 1,551,535 includes a mold defining a tape feed passage along which a pair of slide fastener stringer tapes (hereinafter referred to as "fastener tapes") is fed intermittently. In timed relation to the intermittent feeding of the fastener tapes, a molten thermoplastic synthetic material is injected into the mold to form rows of coupling elements molded on and along inner longitudinal confronting edges of the fastener tapes together with end stop members (top end stops). At the same time, to cope with a growing tendency shown toward the multi-product and small-quantity production of slide fasteners, the length of the rows of molded coupling elements can be adjusted.

The mold is composed of a movable mold member and a fixed mold member jointly defining a pair of rows of cavities for forming the coupling elements. Each of the mold members is provided with a slide core in a form of a rectangular block. Each of the slide cores is disposed on a downstream end of the corresponding mold member and slidably movable in a direction perpendicular to the longitudinal axis of a runner. Confronting mold surfaces of the slide cores define two cavities for forming top end stop members, and a depression interconnecting the cavities and the runner. The cavities and the depression are formed in that part of the slide cores which is located on one side of the slide core in the direction of sliding movement of the slide cores. The side surfaces of the slide cores excluding the communicating portion of the depression with the runner form a closing surface to close one opening end of the runner. The slide cores are movable by a cylinder between a first position in which the depression communicates with the runner, and a second position in which the end of the runner is closed. A control bar is slidably inserted from an upstream end of the mold into the runner. By changing the length of insertion of the control bar relative to the runner, the length of rows of molded coupling elements can be adjusted.

To form rows of coupling elements having a desired length which is n times as large as a predetermined length, where n is an integer, the control bar is longitudinally moved to a position where rows of coupling elements of the predetermined length can be molded. Then, a molten thermoplastic synthetic resin material is injected into the mold. Thereafter, the fastener tapes are advanced by a distance equal to the predetermined length of the coupling elements. The foregoing injection-molding process and the tape advancing process are achieved repeatedly by n times provided that in the final injection-molding process, the slide cores are shifted to the first position to communicate the depression with the runner. Subsequently, the fastener tapes are advanced by a distance which is equal to the sum of the predetermined length and the length of an element-free space portion to be provided between two adjacent fastener element chains. By repeating the foregoing sequence of operations, it is possible to continuously manufacture a plurality of longitudinally spaced slide fastener chains each having a pair of rows of coupling elements of the desired length (which is n times of the predetermined length) and top end stop members molded on the fastener tapes. In addition, by properly adjusting the length of insertion of the control bar relative to the runner, a row of longitudinally spaced slide fastener chains each having a pair of rows of coupling elements of a desired length and two top end stop members can be continuously manufactured.

In the manufacture of such a slide fastener chain with a separable bottom end stop assembly, it has been customary to form reinforcing film layers to the fastener tapes to reinforce these portions of the fastener tapes where the members of separable bottom end stop assembly are attached subsequently. Formation of the reinforcing film layers may be achieved by attaching reinforcing films to separable-bottom-end-stop-attaching portions of the fastener tapes before rows of coupling elements are molded on the fastener tapes. However, as disclosed in Japanese Patent Publication No. 63-40085, the reinforcing films are generally attached to the fastener tapes, respectively, adjacent to one end of an element-free space portion defined between two adjacent slide fastener chains each including a pair of rows of coupling elements, for a reason described below.

Since the fastener tapes have a certain degree of stretchability, the length of the fastener tapes is variable with a change in tension on the fastener tapes which may be caused when the fastener tapes are advanced or when rows of coupling elements and members of a separable bottom end stop assembly are attached. Such a change in the length of the fastener tapes is accumulated when the fastener tapes are processed continuously for long hours. Accordingly, if reinforcing film layers are formed on the fastener tapes before rows of coupling elements and members of a separable bottom end stop assembly are molded, an accurate positioning of the reinforcing film layers is not possible due to an accumulated dimensional change of the fastener tapes. Inaccurate positioning of the reinforcing film layers results in inaccurately molded coupling elements and a separable bottom end stop assembly.

In the method of producing a slide fastener chain with end stop members disclosed in the above-mentioned British patent, due to the reason described above, it is not possible to previously form reinforcing film layers on the fastener tapes unless otherwise relying upon any other appropriate measure. Accordingly, the reinforcing film layers should be formed on that portions of the fastener tapes which are located adjacent to the molded end stop members. In this instance, however, since the rows of coupling elements and the end stop members are molded simultaneously, such a reinforcing film attaching method as disclosed in Japanese Patent Publication No. 63-40085 cannot be used without substantial reconstruction. Instead, another reinforcing-film-attaching technique which can be exclusively used in combination with the above-mentioned fastener chain manufacturing method should be developed. To avoid this difficulty, it may be considered that additional to the cavities for molding end stop members, the mold defining the element-forming cavities and the end-stop-members-forming cavities further has cavities for forming reinforcing films, and the end stop members and the reinforcing film layers are molded simultaneously. The thus molded reinforcing films are, however, relatively thick, and a synthetic resin material tends to flow into the material of the fastener tapes, thus making the stringer tapes inflexible. The inflexible fastener tapes having relatively thick reinforcing film layers will cause various problems when subjected to a subsequent processing operation such as sewing operation.

SUMMARY OF THE INVENTION

It is accordingly a general object of the present invention to overcome all the problems associated with the prior art.

A more specific object of the present invention is to provide a method which is capable of continuously manufacturing a plurality of longitudinally spaced slide fastener chains each having a pair of rows of coupling elements of a desired length and a pair of separable bottom end stop members molded on inner longitudinal edges of a pair of continuous fastener tapes with high positional accuracy.

Another object of the present invention is to provide an efficient method of producing a slide fastener from the slide fastener chain by using a part of a positioning means for the attachment of a box of a separable bottom stop assembly to the first and second pin members of a separable bottom end stop assembly.

A further object of the present invention is to provide an apparatus for applying the slide fastener chain manufacturing method.

In one aspect the present invention provides a method of manufacturing a fastener chain including a pair of rows of coupling elements and a pair of separable bottom end stop members molded on a pair of continuous fastener tapes, respectively, the method comprising the steps of intermittently advancing a pair of continuous fastener tapes along a feed path, attaching a pair of reinforcing films to a pair of separable-bottom- end-stop-member-molding portions of the fastener tapes, respectively, substantially simultaneously with the reinforcing-film-attaching step, forming a pair of positioning holes at a pair of predetermined positions on the reinforcing films, respectively. The method further comprises the steps of positioning longitudinal portions of the respective fastener tapes within and relative to a mold using the positioning holes, and finally injection-molding a pair of rows of coupling elements and a pair of separable end stop members on the fastener tapes within the mold.

In another aspect the invention provides an apparatus for applying the method, the apparatus comprising feed means for intermittently advancing a pair of continuous fastener tapes along a feed path, measuring means disposed in the feed path for measuring a length of travel of the fastener tapes being fed to determine a pair of separable-bottom-end-stop-member-molding portions of the respective fastener tapes, attaching means disposed downstream of the measuring means for attaching a pair of reinforcing films to the separable-bottom-end-stop-member-molding portions of the fastener tapes, respectively, and piercing means disposed downstream of the measuring means and operatively interlocked with the attaching means for forming a pair of positioning holes at a pair of predetermined positions on the reinforcing films, respectively. The apparatus further comprises a molding unit disposed downstream of the piercing means and including a pair of positioning pins receivable in the positioning holes, respectively, of the fastener tapes to position longitudinal portions of the respective fastener tapes within and relative to the molding unit, the molding unit being operable to mold a pair of rows of coupling elements and a pair of separable bottom end stop members on the inner longitudinal portions of the slide fastener tapes respectively, and control means for controlling the operation of the feed means, attaching means, piercing means and molding unit according to information received from the measuring means.

In order to produce a slide fastener with a separable bottom end stop assembly from the slide fastener chain manufactured by the method described above, the positioning holes of the fastener tapes is partly cut out so as to form a pair of substantially U-shaped cutout portions extending transversely from inner longitudinal edges of the respective fastener tapes. The cutout portions, at which line the fastener tapes with the reinforcing films are cut, are used for attaching a box of the separable bottom end stop assembly.

The above and other objects, features and advantages of the present invention will become manifest to those versed in the art upon making reference to the detailed description and the accompanying sheets of drawings in which a preferred structural embodiment incorporating the principles of the present invention is shown by way of illustrative example.

Hereinafter will be described of a process which is achieved for forming a slide fastener chain including a pair of rows of coupling elements of a predetermined length and a separable bottom end stop assembly by means of the apparatus of the present invention.

Feed rollers are driven to advance the fastener tapes. During that time, the length of travel of the fastener tapes is measured by the first measuring means so that when the measured length of travel of the fastener tapes is equal to a predetermined molding length, rotation of the feed rollers is stopped via the control unit.

When the feed rollers are stopped, reinforcing-film-attachment portions of the respective fastener tapes are located in the reinforcing film attaching means. Then, two severed pieces of reinforcing films of a predetermined length are placed respectively over and under the fastener tapes and subsequently fused to tile front and back surfaces of the fastener tapes with beaded edges of the fastener tapes wrapped in the reinforcing films. Simultaneous with this fusing, the piercing means is activated to form a pair of positioning holes at predetermined positions on the respective reinforcing-film-attachment portions.

After a predetermined tension is exerted on the fastener tape, a desired number of coupling elements are molded on inner longitudinal edges of the fastener tapes. At the same time, a first pin member and a second pin member are molded adjacent to one end of the rows of coupling elements. Subsequently, a molded product is removed from the mold and at the same time, the mold surfaces of the mold are set in a position as to only define the coupling-element-forming cavities.

Then, the process of manufacturing a slide fastener chain of the desired length and having members of a separable bottom end stop assembly is completed, by repeating the foregoing sequence of injection-molding operation. Thus a plurality of slide fastener chains each having a pair of rows of coupling elements of a predetermined length and a first pin member and a second pin member can be manufactured continuously one at a time.

When the apparatus of the present invention is used to manufacture fastener chains with separable end stops, a pair of positioning holes are formed at predetermined positions on the respective reinforcing-film-attachment portions of the fastener tapes. The positioning holes are used to position separable-bottom-end-stop-member-molding portions of the molding unit It is to be noted that the positioning holes not only have a positioning function but also have a function to secure the easiness of work in a box attaching process achieved to attached a box to the first pin member and the second pin member.

The runner portion and the like are removed from the chain before attaching a box. Then, two rows of coupling elements on the fastener tapes, now devoid of the runner portion, are interengaged by passing them through a coupling-element engaging means. The coupling-element engaging means may be an engaging device having the same construction as a tape guide portion of a slide fastener slider. When passed through the non-illustrated engaging device, the rows of coupling elements of the molded fastener chain are engaged together, with the second pin member held in abutment with the coupling element located next to the first pin member. As a result, the reinforcing films are displaced in the longitudinal direction of the rows of coupling elements by a distance equal to one element pitch. With this displacement of the reinforcing films, the positioning holes in the reinforcing films, initially staggered by one element pitch, are now held in lateral alignment with each other.

Then, portions of the respective reinforcing films extending between the positioning holes are cut out together with the corresponding portions of the fastener tapes by means of a cutting device so that a pair of substantially U-shaped cutout portions is formed in the fastener tapes, respectively. Owing to the presence of the U-shaped cutout portions, the box can be readily inserted in the element-free space portion, and the box can, therefore, be attached smoothly and reliably to the first pin member and the second pin member. As understood from the foregoing description, the positioning holes doubles in function as positioning holes to determine a position on the fastener tapes where a first pin member and a second pin member are to be molded, and as reference holes for the formation of the U-shaped cutout portions to secure the desired easiness of work when the box is attached.

DETAILED DESCRIPTION

Figure 1:
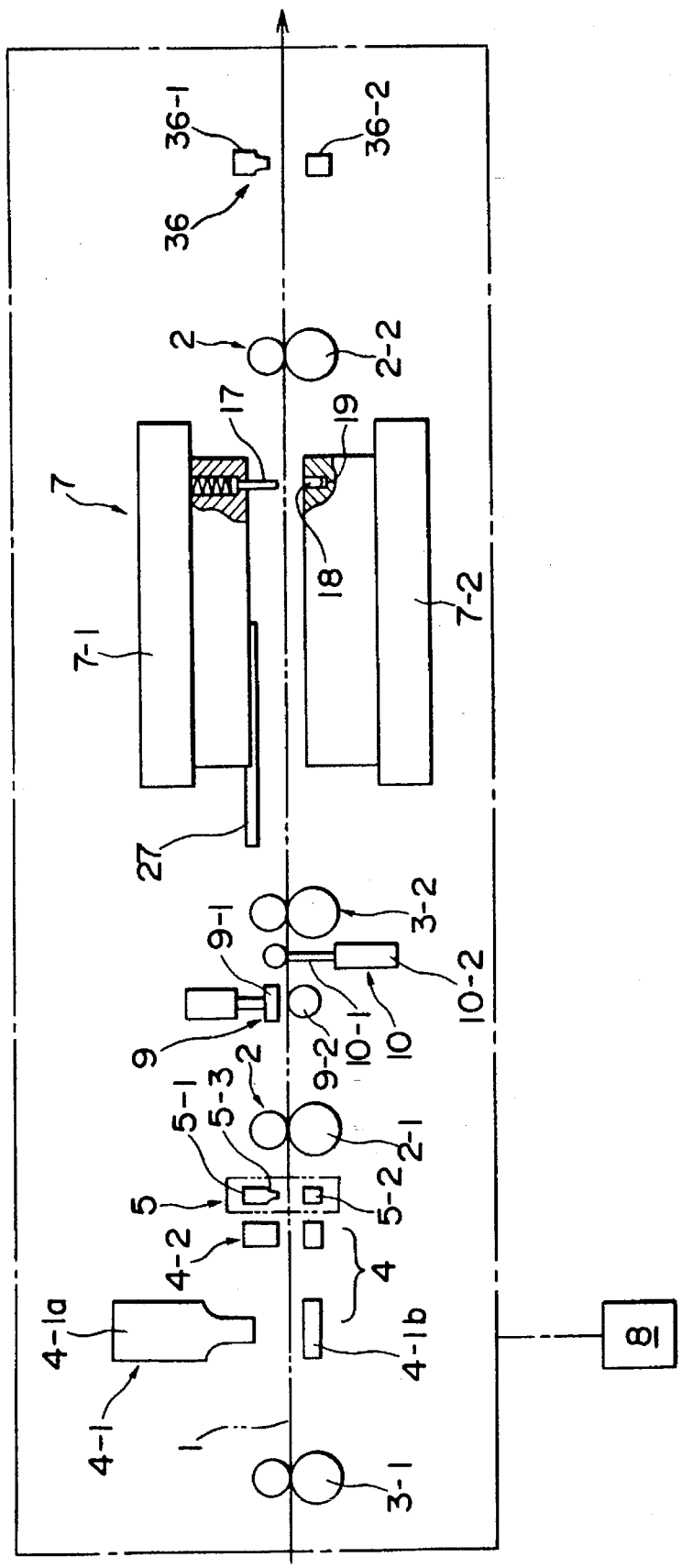
FIG. 1 is a diagrammatical side view, with parts broken away for clarity, showing the general construction of an apparatus for continuously manufacturing a slide fastener chain with separable bottom end stop assemblies according to the present invention.

An illustrated embodiment of this invention will now be described in detail. FIG. 1 shows the general construction of an apparatus for manufacturing a slide fastener chain having members of a separable bottom end stop assembly (a first pin member and a second pin member) according to the present invention. The apparatus generally includes a feed means or unit 2 for intermittently advancing a pair of continuous fastener tapes 1 along a feed path (hereinafter referred to as "tape feed path"), a measuring means or unit 3-1 disposed in the feed tape path for measuring the length of travel of the fastener tapes 1 being advanced to determine reinforcing-film-attachment portions (identical to separable-bottom-end-stop-member-molding portions) of the respective fastener tapes 1, a reinforcing film attaching means or unit 4 disposed downstream of the measuring unit 3-1 for attaching a pair of reinforcing films to the corresponding reinforcing-film-attachment portions of the fastener tapes 1, a piercing means or unit 5 disposed downstream of the measuring unit 3-1 and operatively interlocked with the reinforcing film attaching unit 4 for forming a pair of positioning holes at a pair of predetermined position on the reinforcing films, respectively, a molding unit 7 disposed downstream of the piercing unit 5 for molding a pair of rows of coupling elements and a pair of separable bottom end stop members (a first pin member and a second pin member) of a separable bottom end stop assembly on and along inner longitudinal edges of the fastener tapes 1, the molding unit 7 including a positioning means composed of a pair of positioning pins receivable in the corresponding positioning holes to position the fastener tapes 1 within the molding unit 7, (described below according to FIG. 7) and a control unit 8 for controlling the operation of the feed unit 2, reinforcing film attaching unit 4, piercing unit 5 and molding unit 7 according to information received from the measuring unit 3-1.

In the illustrated embodiment, the feed unit 2 is composed of a pair of first feed rollers 2-1 and a pair of second feed rollers 2-2. The measuring unit 3-1 applies an encoder. Additional to the measuring unit 3-1, a second measuring unit 3-2 composed of an encoder is also provided. The first feed rollers 2-1 are disposed adjacent to and downstream of the piercing unit 5. The second feed rollers 2-2 are disposed adjacent to and downstream of the molding unit 7. A tape clamping device 9 and a tape pullback device 10 are disposed between the first feed rollers 2-1 and the second measuring unit 3-2 in the order named as viewed from the upstream side of the tape feed path. The tape clamping device 9 and the tape pullback device 10 jointly form a reverse feed means for feeding the fastener tapes 1 in a reverse direction by a slight distance.

Figure 2:
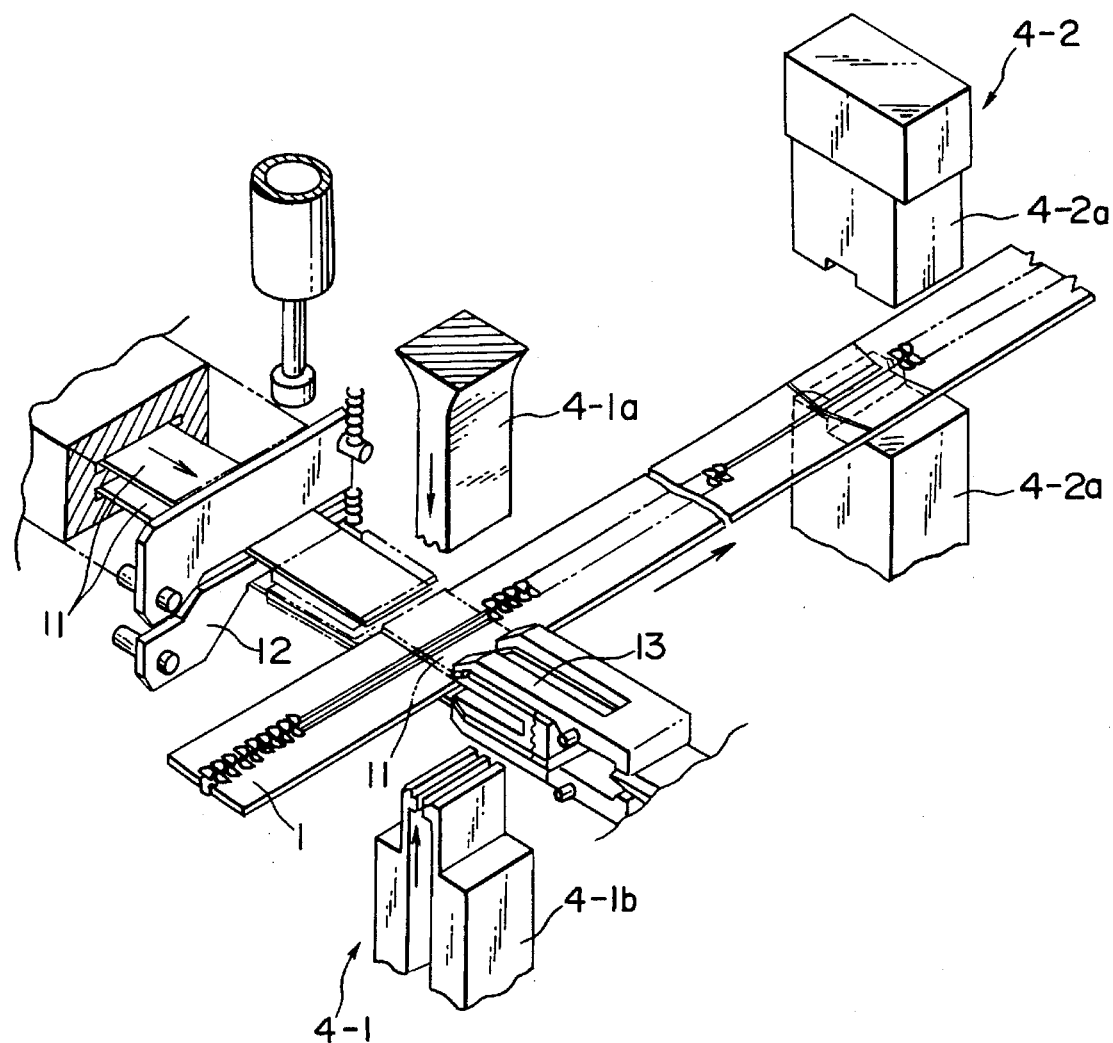
FIG. 2 is a perspective view showing a reinforcing film attaching mechanism of the apparatus applied to this invention.

The reinforcing film attaching unit 4 may apply the same as the reinforcing film attaching unit disclosed in Japanese Patent Publication No. 63-40085 previously described. As generally shown in FIG. 2, the reinforcing film attaching unit 4 is generally constructed such that a pair of vertically spaced continuous tapes of reinforcing film 11 is intermittently fed in a direction perpendicular to the tape feed path. A cutter 12 is disposed in a feed path of the reinforcing film tapes 11 and located one side of the tape feed path. When the reinforcing film tapes 11 are advanced by a predetermined distance, the cutter 12 is driven to sever or cut off a pair of upper and lower pieces of reinforcing film 11 from the continuous reinforcing film tapes 11. A gripper 13 is disposed on the opposite side of the tape feed path in alignment with the feed path of the reinforcing film tapes 11. The gripper 13 is reciprocally movable toward and away from the severed reinforcing film pieces 11 across the tape feed path to grip the front ends of the respective reinforcing film pieces 11 and then transfer the reinforcing film pieces 11 to a position in which the reinforcing film pieces 11 lie respectively over and under the fastener tapes 1 at rest.

Figure 3:
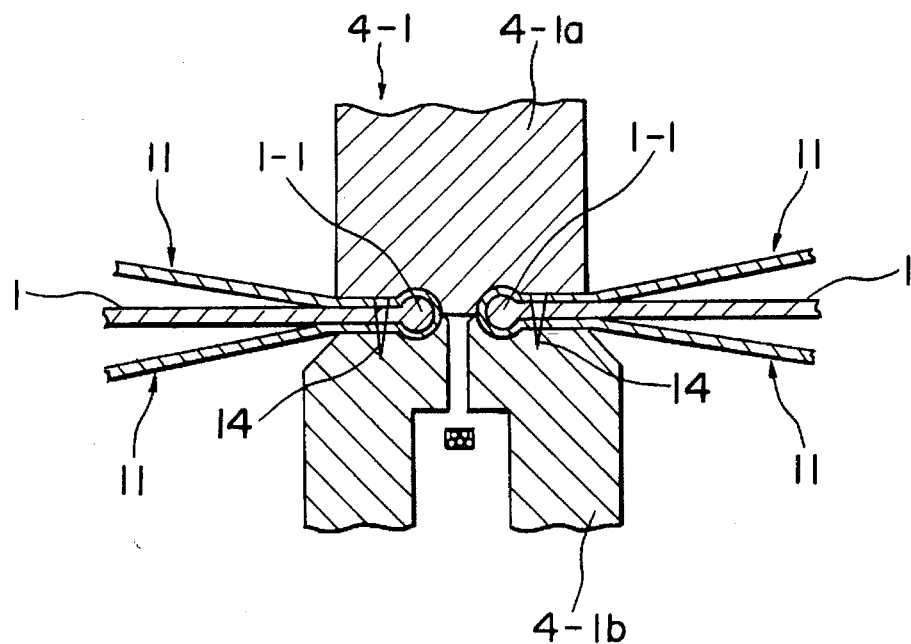
FIG. 3 is a vertical cross-sectional view showing a ultrasonic welder forming one part of the reinforcing film attaching mechanism.
Figure 4:
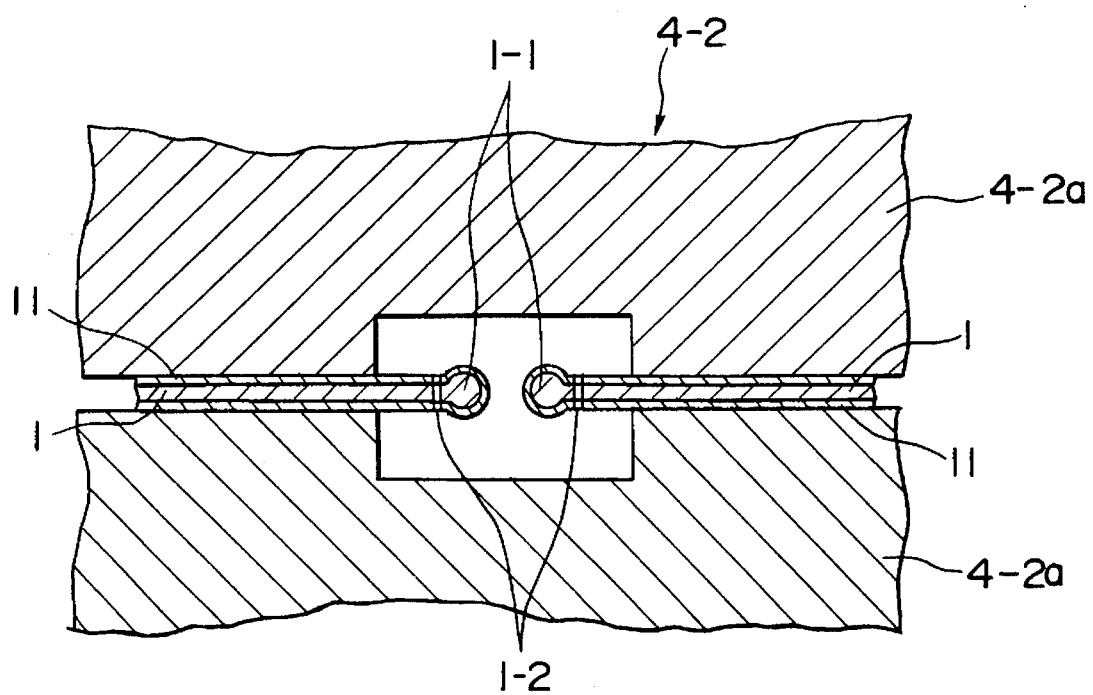
FIG. 4 is a vertical cross-sectional view showing a heat fusing device forming the other part of the reinforcing film attaching device.
Figure 5:
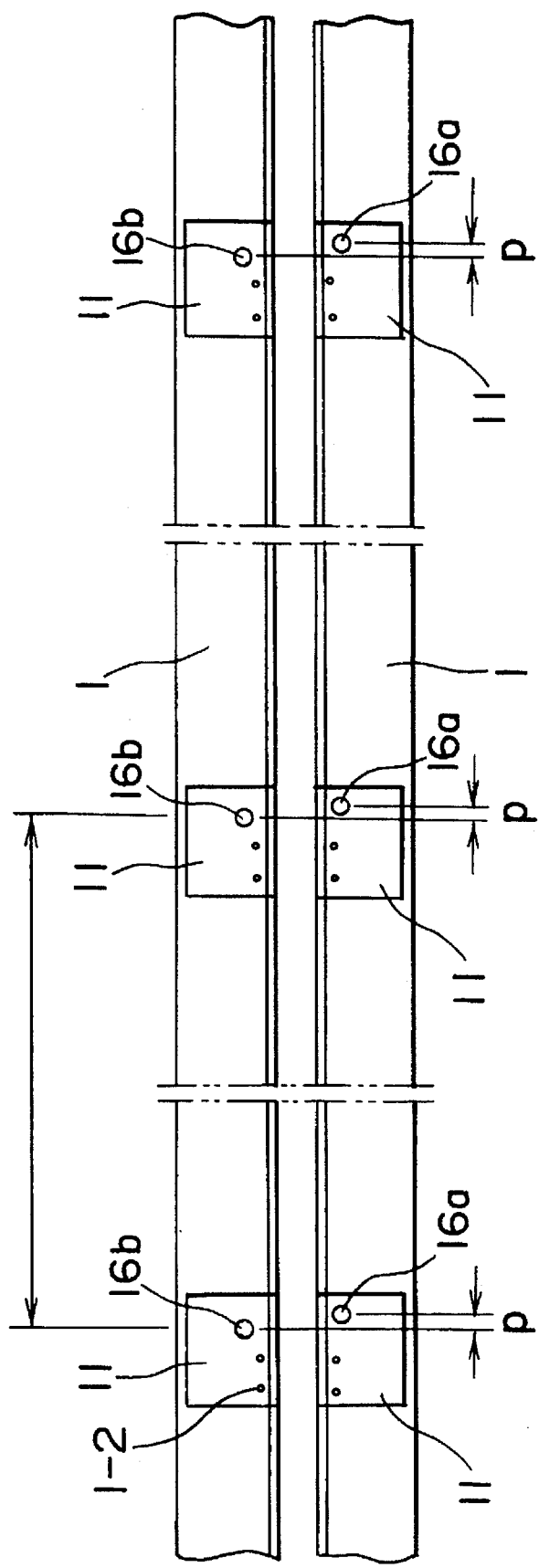
FIG. 5 is a fragmentary plan view showing a pair of continuous slide fastener tapes each having reinforcing tapes attached thereto.

An ultrasonic welding device or welder 4-1 which constitutes one part of the reinforcing film attaching unit 4 is disposed on a position corresponding in position to reinforcing-film-attachment portions of the respective fastener tapes 1 at rest. The ultrasonic welder 4-1 is composed of a ultrasonic horn 4-1a and an anvil 4-1b that are constructed to have cross-sectional shapes shown in FIG. 3. The ultrasonic horn 4-1a and the anvil 4-1b cooperate to cut the upper and lower reinforcing film pieces 11 at their central portions and fuse them to inner longitudinal edge portions of the fastener tapes 1, so that the beaded inner longitudinal edges 1-1 wrapped or embraced with the upper and lower reinforcing film pieces 11. A heat fusing device 4-2 which constitutes the other part of the reinforcing film attaching unit 4 is disposed adjacent to and downstream of the ultrasonic welder 4-1. The heat fusing device 4-2 is composed of a pair of upper and lower die plates 4-2a, 4-2a each provided with a heater (not shown). As shown in FIG. 4, the die plates 4-2a, 4-2a are driven toward each other by a suitable actuating means (not shown) so as to grip therebetween unfused portions of the reinforcing film pieces 11 and fuse them to the fastener tapes 1. In the illustrated embodiment, the ultrasonic horn 4-1a has on its downwardly facing front surface a plurality of pins 14, while the anvil 4-1b has on its upwardly facing front surface a plurality of holes (shown in FIG. 3 but not designated) receptive of the corresponding pins 14 of the ultrasonic horn 4-1a for forming a plurality of pinholes 1-2 in the fastener tapes 1 near the beaded inner longitudinal edges 1-1, as shown in FIGS. 3, 4 and 5. When a first pin member and a second pin member of a separable bottom end stop assembly are molded on the respective fastener tapes 1 in a manner described later, a molten synthetic resin material flows into the pinholes 1-2 and integrally connects integrate upper and lower portions of the first and second pin members to firmly attach the pins to the corresponding fastener tapes 1.

The piercing unit 5, which is disposed adjacent to and downstream of the fusing device 4-2 for forming a pair of positioning holes 16a, 16b in the fastener tapes 1, respectively, is the most important structural part of the present invention. The piercing unit 5 is disposed above a position where predetermined positions on the reinforcing films 11 are disposed while the fastener tapes 1 are at rest. The piercing unit 5 is composed of a body 5-1 adapted to be driven by a suitable actuator such as an air cylinder (not shown) and vertically reciprocating in synchronism with the fusing device 4-2, and a die 5-2 disposed below the tape feed path and vertically aligned with the piercing unit body 5-1.

The piercing unit body 5-1 has on its under surface a pair of piercing punches 5-3 (FIG. 1) having a predetermined diameter, while the die 5-2 has in its top surface a pair of holes (not shown) receptive of the corresponding piercing punches 5-3. The relative position between the piercing unit 5 (i.e., the body 5-1 and the die 5-2) and the heat fusing device 4-2 can be adjusted by, for example, a ball screw mechanism (not shown).

Figure 9:
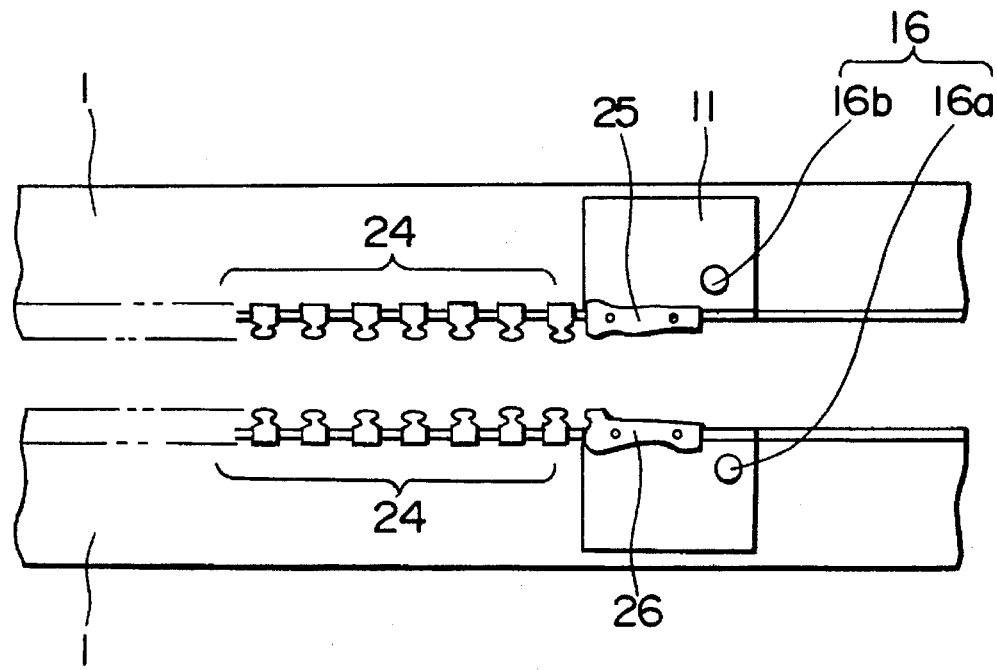
FIG. 9 is a fragmentary plan view of a slide fastener with rows of coupling elements and members of a separable bottom end stop assembly shown in a condition just after the removal of the runner and gate portions.

In the illustrated embodiment, the positioning holes 16a and 16b formed in the respective fastener tapes 1 across the thickness of the reinforcing films 11 are staggered or displaced in the longitudinal direction of the fastener tapes 1 by a distance equal to a pitch p of each coupling element, as shown in FIG. 5. More particularly, the positioning hole 16b formed at side of the first pin member 25 is closer to an end of the corresponding coupling element row by one coupling-element pitch p than the positioning hole 16a formed on the second pin member 26 side, as shown in FIG. 9.

The first feed rollers 2-1, which are disposed adjacent to and downstream of the piercing unit 5, are intermittently driven by the instructions supplied from the control unit 8 based on the data from the measuring unit 3-1. The control unit 8 stores therein various items of data about production control, such as the length, color tone, quantity of production and order of production of fastener chains having separable bottom end stop assembly, as well as data about production procedures. Based on various signals supplied in succession from the measuring unit 3-1, second measuring unit 3-2 and proximity switches (described later), the control unit 8 sends control signals to the various operating mechanisms according to a predetermined control program. The measuring unit 3-1 is used mainly for determining the length of a pair of rows of coupling elements to be molded, the length of an element-free space, and the position on the fastener tapes where the reinforcing films 11 are to be attached.

The tape clamping device 9 and the tape pullback device 10 are disposed downstream of the measuring unit 3-1 in the order named as viewed from the upstream side of the tape feed path. These devices 9 and 10 cooperate to slightly pull the fastener tapes 1 back in a direction opposite to the advancing direction to stretch or tension longitudinal portions of the respective fastener tapes 1 positioned within the molding unit 7 while the rows of coupling elements and the pin members of a separable bottom end stop assembly are molded in the molding unit 7. The tape clamping device 9 is composed of a vertically reciprocating presser member 9-1 disposed above the tape feed path and a guide roller 9-2 disposed below the presser member 9-1 for guiding thereon the under surfaces of the fastener tapes 1. The tape pullback device 10 is composed of a pullback bar 10-1 extending transversely across the upper surfaces of the fastener tapes 1, and a cylinder actuator 10-2 for vertically reciprocating the pullback bar 10-1. The reverse feed of the fastener tapes 1 which is achieved by the tape clamping device 9 and the tape pullback device 10 does not exert any influence on an upstream portion of the fastener tapes 1 lying over and across the measuring unit 3-1, reinforcing film attaching unit 4 and piercing unit 5. Accordingly, the length of travel of the fastener tapes 1 achieved by the subsequent forward feeding is completely free from influence of the reverse feed of the fastener tapes 1. Operation of the tape clamping device 9 and the tape pullback device 10 is controlled according to the instructions supplied from the control unit 8.

The second measuring unit 3-2 is disposed between the tape pullback device 10 and the molding unit 7 for measuring the length of a portion of the fastener tapes 1 fed in the molding unit 7 each time when two row of coupling elements are to be molded or when two rows of coupling elements and two pin members of a separable bottom end stop assembly are to be molded simultaneously. With this measurement, the length of a molded product (i.e, a slide fastener chain with separable bottom end stop assembly) can be controlled precisely. More particularly, when the coupling elements and the pin members of a separable bottom end stop assembly are to be molded simultaneously, the measurement by the second measuring unit 3-2 is achieved such that the positioning holes 16a, 16b in the reinforcing-film-attachment portions (separable-end-stop-member-molding portions) of the fastener tapes 1 being advanced slightly overrun the position of the corresponding positioning pins 6 of the molding unit 7.

Figure 6:
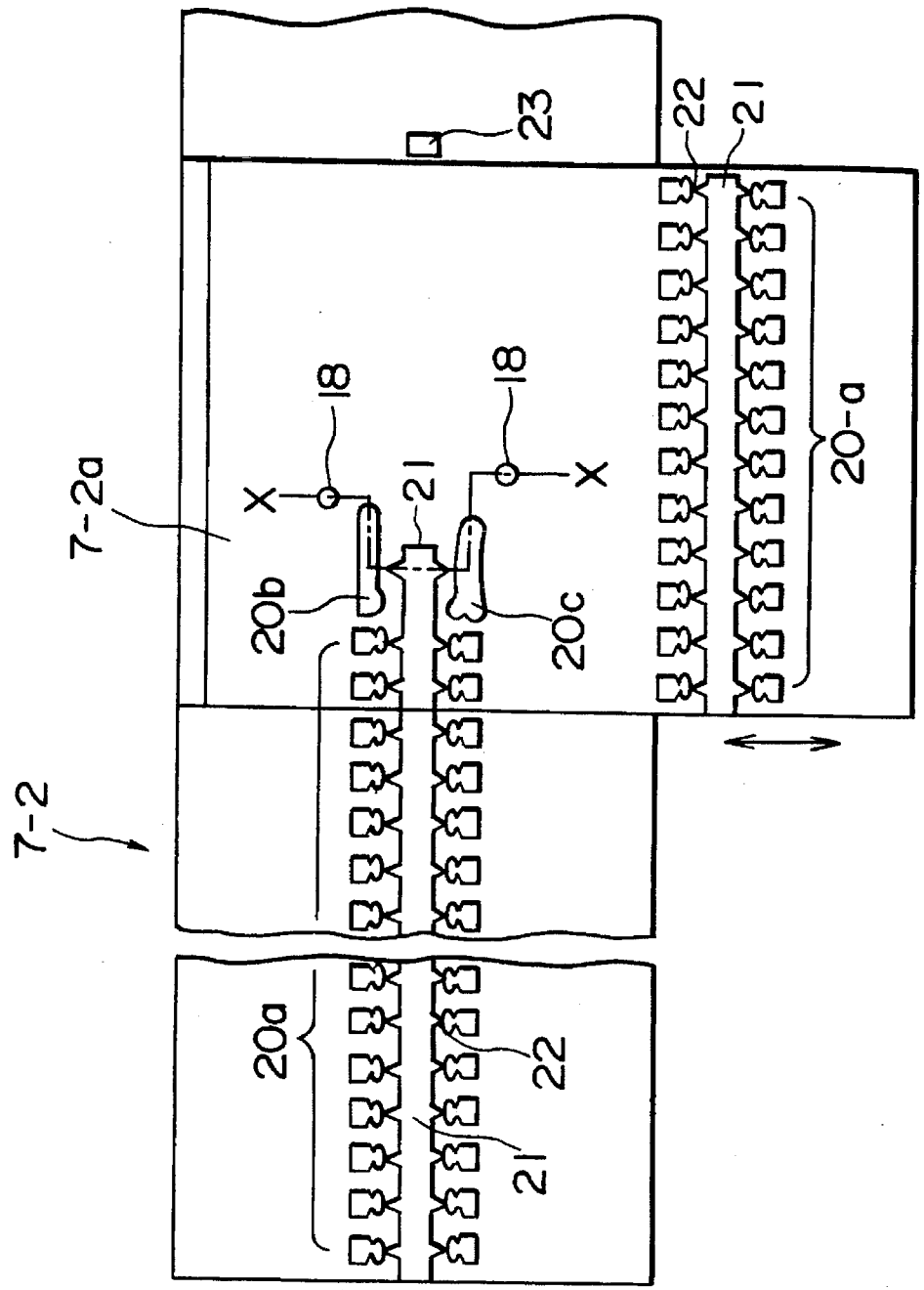
FIG. 6 is a plan view showing the molding surface of a mold used in one embodiment of the present invention.
Figure 7:
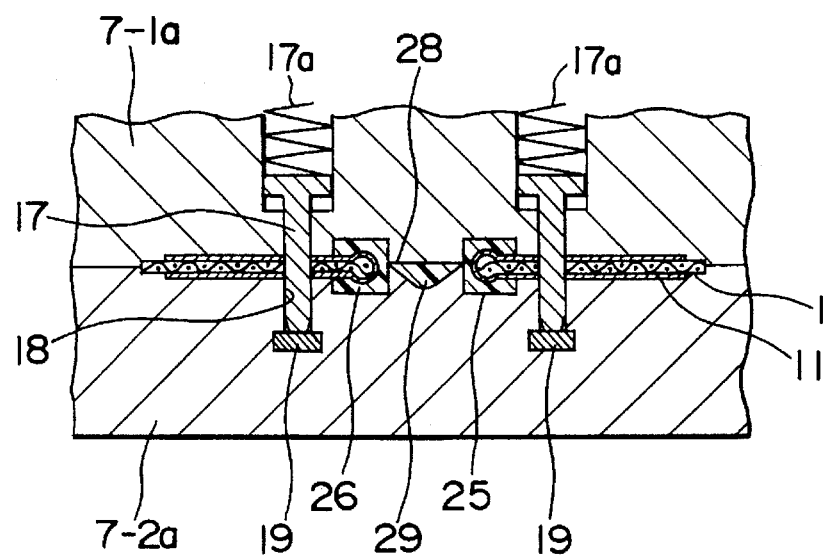
FIG. 7 is an enlarged cross-sectional view taken along lines X—X in FIG. 6.

The molding unit 7 which is disposed adjacent to and downstream of the second measuring unit 3-2 has substantially the same construction as the molding unit disclosed in British Patent No. 1,551,635 described above. As shown in FIGS. 6 and 7, the molding unit 7 includes a mold composed of an upper movable mold member 7-1 and a lower fixed mold member 7-2. The mold members 7-1, 7-2 have confronting mold surfaces configurated in symmetry to define cavities 20a, b, c, a runner 21 and gates 22. Likewise the mold disclosed in the above-mentioned British Patent, the molds include a pair of slide core 7-1a, 7-2a assembled with the movable and fixed mold members 7-1, 7-2, respectively, and slidably movable in a direction perpendicular to the tape feed path. As shown in FIG. 6, each of the slide cores 7-1a, 7-2a (only the slide core 7-2a associated with the fixed core 7-2 being shown) has a first half formed with two rows of mold cavities 20a, 20a for molding coupling elements 24 (FIG. 9) and a mold cavity 20b aligned with one row of mold cavities 20a for molding a first pin member 25 of a separable bottom end stop assembly, and a mold cavity 20c aligned with the other row of cavities 20a for molding a second pin member 26 of the separable bottom end stop assembly, all the cavities 20a, 20b, 20c being connected with a runner 21 by a plurality of gates 22. In a second half, each of the slide cores 7-1a, 7-2a is formed with two rows of cavities 20a of the same pitch for molding coupling elements 24, the cavities 20a being connected with a runner 21 by a plurality of gates 22. The runner 21 in the first half and the runner 21 in the second half are symmetrical with each other about a central line and they are selectively aligned with a runner 21 of the mold when the slide cores 7-1a, 7-2a are shifted in position relative to the corresponding mold member 7-1, 7-2.

The mold of the present invention differs from the mold disclosed in the above-mentioned British patent in that the slide core 7-1a of the movable mold member 7-1 has a pair of positioning pins 17 projecting from the mold surface and respectively engageable with the positioning holes 16a, 16b in the fastener tapes 1, as shown in FIG. 7, that the slide core 7-2a of the fixed mold member 7-2 has a pair of pin-receiving blind holes 18 receptive of the positioning pins 17, respectively, and that a pair of proximity switches 19 are disposed on the bottoms of the pin-receiving holes 18, respectively.

As shown in FIG. 7, the positioning pins 17 are urged by a pair of compression coil springs 17a, respectively, to project downwardly from the mold surface of the slide core 7-1a. ON-OFF signals from the proximity switches 19 are sent via the control unit 8 of FIG. 1 to the tape clamping device 9 and the tape pullback device 10 to control the operation of these devices 8, 10. A feeler 23 (FIG. 6) projects from the mold surface of the fixed mold member 7-2 at a position which is aligned with the runner 21 and immediately downstream of the slide core 7-2a. Though not shown, the movable mold member 7-1 has a hole corresponding in position to the position of the feeler 23 for receiving therein the feeler 23. As shown in FIG. 1, a control bar 27 is slidably received in the runner 21 of the movable mold member 7-1 from an upstream end thereof. The control bar 27 is inserted slidably in the longitudinal direction by a suitable actuator (not shown) to adjust the length of a pair of rows of coupling elements molded by a single run of the injection-molding process of the molding apparatus 7.

The second feed rollers 2-2 disposed downstream of the molding unit 7 are intermittently driven under the control of the instructions received from the control unit 8. In case that the slide fastener chain manufacturing apparatus of the foregoing construction are combined with a top end stop applying unit, a slider applying unit, a box attaching unit, and a tape cutter (neither shown) that are disposed downstream of the second feed rollers 2-2. A gate cutoff roller 30 is associated with the second feed rollers 2-2 for removing a runner portion and gate portions from a molded product.

Using the apparatus previously described, it is possible to manufacture a slide fastener chain having a pair of rows of coupling elements of a predetermined length and a first pin member and a second pin member of a separable bottom end stop assembly molded on the fastener tapes, in a manner described below.

At first, the slide cores 7-1a, 7-2a of the movable and fixed mold members 7-1, 7-2 are disposed in the position shown in FIG. 6, in which the cavities 20a for molding the rows of coupling elements and the cavities 20b, 20c for molding the first pin member and the second pin member are communicated with each other via the gate 22 and the runner 21. The control bar 27 shown in FIG. 1 is displaced along the runner 21 to set the length of the rows of cavities 20a to a value which is 1/n times the predetermined length of the rows of coupling elements to be molded, where n is an integer. Then, the first feed rollers 2-1 and the second feed rollers 2-2 are driven to advance the fastener tapes 1 longitudinally from the left to the right on FIG. 1. During that time, the length of travel of the fastener tapes 1 is measured by the first measuring unit 3-1. When the length of travel of the fastener tapes 1 is equal to a predetermined molding length, the first measuring unit 3-1 sends a signal to the control unit 8 to stop the rotation of the first and second feed rollers 2-1, 2-2.

When the first and second feed rollers 2-1, 2-2 are stopped, reinforcing-film-attachment portions of the respective fastener tapes 1 are reached at the ultrasonic welder 4-1 of the reinforcing film attaching unit 4. While the fastener tapes 1 are at rest, two severed pieces of reinforcing films 11 of a predetermined length are placed by the gripper 13 (FIG. 2) respectively over and under the fastener tapes 1, and subsequently the ultrasonic welder 4-1 is driven to cut and fuse the reinforcing film pieces 11 such that inner longitudinal edge portions including the beaded edges 1-1 of the fastener tapes 1 are wrapped in the reinforcing films 11. Simultaneous with this fusing, a plurality of pinholes 1-2 are formed adjacent to each of the beaded edges 1-1 of the fastener tapes 1. Then, the first and second feed rollers 2-1, 2-2 are driven again to advance the fastener tapes 1 until the reinforcing films 11 on the fastener tapes 1 arrive at the heat fusing device 6-2. In response to this arrival of the reinforcing films 11, the heat fusing device 4-2 is driven to fuse the reinforcing films 11 to that portion of the fastener tapes 1 excluding the beaded edges 1-1. Thus, the reinforcing films 11 are completely fused with the reinforcing film attachment portions of the fastener tapes 1. Simultaneously with this fusing, the piercing unit 5 is driven to form a pair of positioning holes 16a, 16b in the fastener tapes 1, respectively, at predetermined positions on the reinforcing-film-attachment portions, as shown in FIG. 5.

Subsequently, the first and second feed rollers 2-1, 2-2 are driven again to advance the fastener tapes 1 under the control of the second measuring unit 3-2 until the positioning holes 16a, 16b formed in the reinforcing-film-attachment portions slightly overrun the positions of the corresponding positioning pins 17 of the molding unit 7. When the intended overrun is atttained, the first and second feed rollers 2-1, 2-2 are stopped. At this time, an upstream end of a previously molded pair of rows of coupling elements 24 slightly overruns the feeler 23 toward the downstream side. The movable mold member 7-1 is previously lowered to a position close to the fixed mold member 7-2.

With this closely spaced arrangement of the movable and fixed mold members 7-1, 7-2, the positioning pins 17 projecting downwardly from the slide core 7-1a of the movable mold member 7-1 under the force of the compression coil springs 17a are in resilient contact with the fastener tapes 1 while being advanced. Accordingly, when the positioning holes 16a, 16b are about to pass through the corresponding positioning pins 17, the downwardly urged positioning pins 17 fit into the positioning holes 16a, 16b, then advance downwardly into the pin-receiving holes 18 in the slide core 7-2a of the fixed mold member 7-2 under the force of the compression coil springs 17a, and finally activate the proximity switches 19 disposed on the bottoms of the respective pin-receiving holes 18. Upon activation, the signals of the proximity switches 19 are sent for the tape clamping device 9 and the tape pullback device 10 to drive these device 9, 10. Then, the presser member 9-1 of the tape clamping device 9 descends toward the guide roller 9-2 to grip the fastener tapes 1 therebetween, thereby preventing the fastener tapes 1 from moving in the upstream direction beyond the tape clamping device 9. Substantially at the same time, the pullback bar 10-1 of the tape pullback device 10 is lowered by a predetermined distance to bend the fastener tapes 1 downwardly into a substantially V-shaped configuration between the tape clamping device 9 and the second measuring unit 3-2, whereby a portion of the fastener tapes 1 received in the molding unit 7 is slightly pulled backwards (toward the upstream direction) and stretched under a predetermined tension. With the fastener tapes 1 thus tensioned, there is a space between tile positioning pins 17 and the feeler 23, which space eventually forms and element-free space portion 34 of a predetermined length between two adjacent slide fastener chains on the fastener tapes 1.

Then, the movable mold member 7-1 is further lowered to fully close the mold, and after that a molten synthetic resin material is injected into the mold whereby a pair of rows of coupling elements 24 of a predetermined length and a first pin member 25 and a second pin member 26 of a separable bottom end stop assembly are molded on and along inner longitudinal edges of the fastener tapes 1.

A molded product is cooled in the mold for a predetermined period of time, and after the lapse of the cooling time, the mold is opened and the molded product is removed from the mold by means of ejector pins (not shown). Then, the slide cores 7-1a, 7-2a of the respective mold members 7-1, 7-2 are shifted upwardly in FIG. 6 from a first position to a second position in which two rows of coupling-element-forming cavities 20a extend longitudinally across the mold surfaces of the mold members 7-1, 7-2.

Then, the fastener tapes 1 are advanced by a distance equal to the next molding length. In this instance, the fastener tapes 1 are overfed until a trailing end (upstream end) of the rows of molded coupling elements 24 overruns the feeler 23. Thereafter, tile tape clamping device 9 and the tape pullback device 10 are operated again to slightly pull the fastener tapes 1 backwards until the trailing end of the previously molded rows of coupling elements 24 engages with the feeler 23, thereby exerting a proper tension on a portion of the fastener tapes 1 received in the molding unit 7. Then, the mold is closed and the next injection-molding process is executed with the result that two rows of coupling elements 24 extending continuously with the previously molded rows of coupling elements 24 are formed. The injection-molding process is repeated by (n−1) times so that a slide fastener chain of the predetermined length including a pair of rows of coupling elements and a first pin member 25 and a second pin member 26 of a separable bottom end stop assembly is produced.

Thereafter, the slide cores 7-1a, 7-2a of the respective mold members 7-1, 7-2 are displaced to resume the first position shown in FIG. 6. While the mold is closed, a first injection-molding process is achieved to form a portion of a complete slide fastener chain which includes a pair of rows of coupling elements 24 of a predetermined molding length and a first pin member 25 and a second pin member 26 of a separable bottom end stop assembly. Then, the slide cores 7-1a, 7-2a are shifted, and an injection-molding process is achieved to form a portion of the complete slide fastener chain composed by two rows of coupling elements only. This injection-molding process is repeated by (n−1) times. As a result, a slide fastener chain including a pair of rows of coupling elements 24 of a predetermined length and a first pin member 25 and a second pin member 26 of a separable bottom end stop assembly is formed on the fastener tapes 1.

In the manufacture of the slide fastener chains according to the present invention, a pair of positioning holes 16a, 16b are formed at predetermined positions on the respective reinforcing-film-attachment portions of the fastener tapes 1. The positioning holes 16a, 16b are used to position a separable bottom end stop assembly of the fastener tapes 1 relative to the pin-forming cavities 20b, 20c of the molding unit 7 with respect to each individual slide fastener length. Owing to this individual-fastener-length basis positioning, the process of the present invention is completely free from a cumulative positioning error which would otherwise be caused due to a frequent change in tension on the fastener tapes during continuous production of the elongated slide fastener chains, thus realizing a precise positioning.

It is to be noted that additional to the positioning function described above, the positioning holes 16a, 16b further has a function to facilitate assembling between a box 35 of a separable bottom end stop assembly with the first pin member 25 and the second pin member 26 of a slide fastener chain. The present invention will be further described below in conjunction with a box assembling process, accompanying the drawings.

Figure 8:
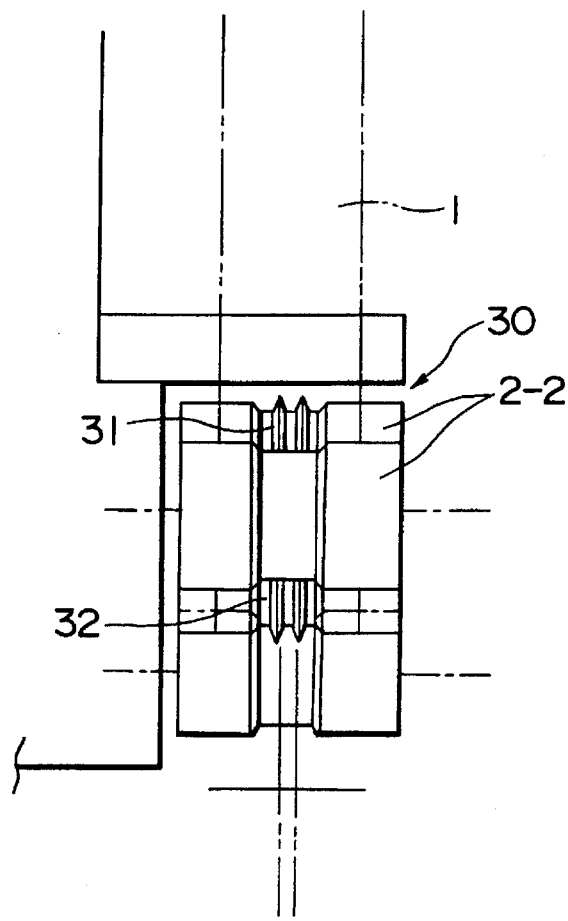
FIG. 8 is a diagrammatical plan view of a gate cutoff roller used to remove a runner portion and gate portions from a molded slide fastener chain.

In general, subsequent to the injection-molding process, a box 35 of a separable bottom end stop assembly is assembled with the first pin member 25 and the second pin member 26 of a molded slide fastener chain while keeping the two rows of molded coupling elements 24 in a coupled condition. The molded slide fastener chain as it is molded has a plurality of gate portions 28 and a runner portion 29 including a sprue (not shown) that are formed simultaneously with formation of the coupling elements 24, first pin member 25 and second pin member 26. Such an as-molded slide fastener chain is not suited for attaching a box. Accordingly, the gate portions 28 and the runner portion 29 are removed from the molded slide fastener chain by means of a suitable removing device before a box is attached. The removing device may be a gate cutoff roller 30 shown in FIG. 8. The gate cutoff roller 30 has, on the pheripheral surface of the second feed rollers 2-2 of the forementioned embodiment, a pair of laterally spaced cutting edges 31 for cutting a joint portions between each of the molded coupling element and a corresponding gate portion 28 and a peripheral groove 32 for receiving and guiding the molded coupling elements 24.

Figure 10:
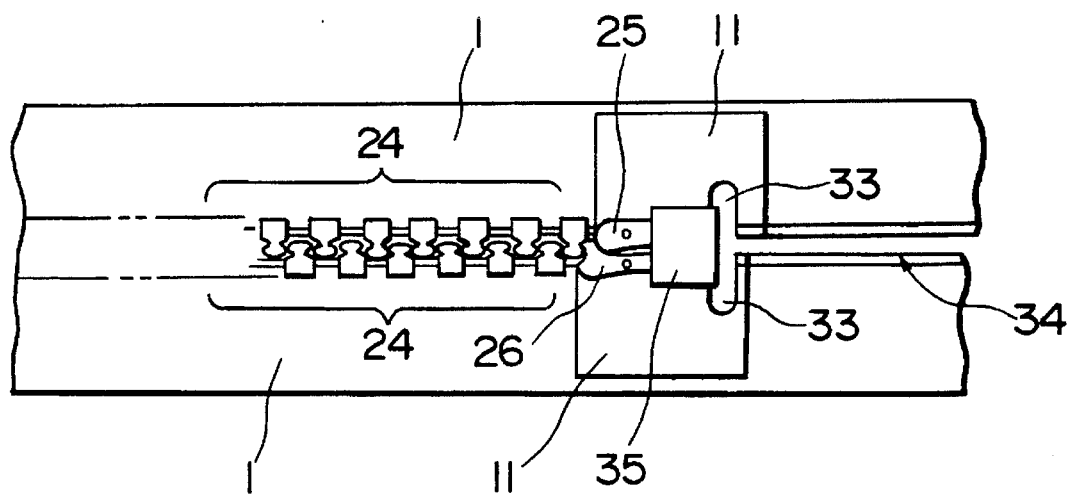
FIG. 10 is a fragmentary plan view showing a slide fastener chain with a box attached to a first pin member to complete a separable bottom end stop assembly.

Two rows of coupling elements 24 of the molded slide fastener chain now free from the gate portions 28 and the runner portion 29 are then interengaged with each other by a suitable coupling-element engaging means (not shown). The coupling-element engaging means may be an engaging device having the same construction as a tape guide portion of a slide fastener slider. When passed through the non-illustrated engaging device, the rows of coupling elements of the molded slide fastener chain are engaged together, with the second pin member 26 held in abutment with the coupling element 24 located next to the first pin member 25, as shown in FIG. 10. As a result of this engagement of the coupling element rows, the portions of the reinforcing films 11 attached by the reinforcing film attaching unit 4 are staggered in the longitudinal direction of the fastener tapes 1 by a distance equal to one element pitch p. With this displacement of the reinforcing films 11, the positioning holes 16a and 16b in the reinforcing films 11, initially staggered by one element pitch p in the longitudinal direction of the fastener tapes 1, are now held in lateral alignment with each other.

Then, using a suitable cutout device 36 composed of a cutout punch 36-1 and a die 36-2, portions of the respective reinforcing films 11 extending between the positioning holes 16a, 16b are cut out together with the corresponding portions of the fastener tapes 1 so as to form a pair of substantially U-shaped cutout portions 33, 33. Subsequent to the formation of the U-shaped cutout portions 33, a box 35 is attached to the slide fastener chain by means of a suitable box attaching device (not shown), which is conventionally known. The box attaching device is known per se and generally constructed such that as a slide fastener chain is advanced towards a box set in the box attaching device, the box 35 is smoothly received in the U-shaped cutout portions 33, subsequently fitted over the first pin member 25 and the second pin member 26, and finally attached to the first pin member 25 by fusing with a known welding means (not shown).

In this instance, if the U-shaped cutout portions 33 are not present, the element-free space portion 34, which is made relatively inflexible due to the presence of the reinforcing films 11, tends to obstruct the entry of the box 35 into the element-free space portion 34 and the subsequent insertion of the first pin member 25 and the second pin member 26 into the box 35. According to the present invention, owing to the presence of the U-shaped cutout portions 33, the box 35 can be readily inserted in the element-free space portion 34. Thus, subsequent insertion of the first pin member 25 and the second pin member 26 into the box 35 can be achieved smoothly and reliably. As understood from the foregoing description, the positioning holes 16a, 16b doubles in function as positioning holes to determine a position on the fastener tapes 1 where a first pin member 25 and a second pin member 26 are to be molded, and as reference holes for forming a pair of U-shaped cutout portions 33 in the fastener tapes 1 to facilitate smooth and reliable attachment of a retainer box 35 relative to the first pin member 25 and the second pin member 26.

Figure 11:
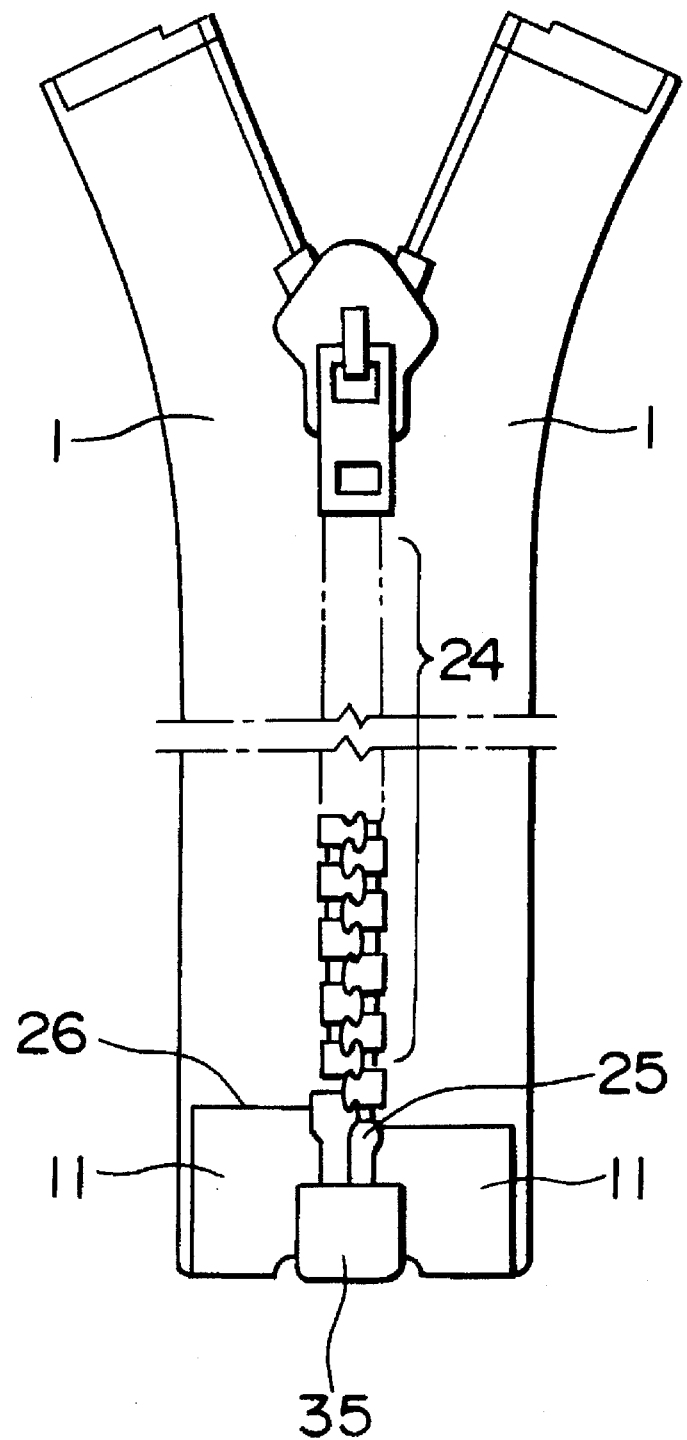
FIG. 11 is a plan view of a slide fastener produced as a final product from the slide fastener chain according to the present invention.

The order of the box attaching steps described above is not restrictive. As an alternative, the box may be attached after a slider is mounted on the slide fastener chain. After, all the components required for completing individual slide fasteners have been attached to the slide fastener chain, the slide fastener chain is cut off or severed at the U-shaped cutout portions 33 transversely across the fastener tapes 1 to successively produce a number of slide fasteners each having a separable bottom end stop assembly, such as shown in FIG. 11.

It is apparent from the foregoing description that according to a method and apparatus of the present invention for manufacturing a slide fastener chain having a separable bottom end stop assembly, a pair of positioning holes is formed at predetermined positions on reinforcing films attached to a pair of fastener tapes. The positioning holes are used to position the fastener tapes relative to a molding unit on the basis of each individual slide fastener length. Accordingly, even when a continuous slide fastener chain is produced, a positioning error which may be caused due to a change in tension on the fastener tapes is limited to a such an extent which is created only in the individual slide fastener length. Thus, a pair of rows of coupling elements and a first pin member and a second pin of a separable bottom end stop assembly can be molded precisely. Additional to its primary positioning function, the positioning holes further have a function to provide a reference when a pair of U-shaped cutout portions is formed transversely in the reinforcing films so as to facilitate smooth and reliable attachment of a box relative to the first pin member and the second pin member, and also have a function to provide a reference when the slide fastener chain is cut off or severed at the U-shaped cutout portions transversely across the fastener tapes.

Obviously, various minor changes and modifications of the present invention are possible in the light of the above teaching. It is therefore to be understood that within the scope of the appended claims the invention may be practiced otherwise than as specifically described.

Although the seperable bottom end stop assembly is molded on the fastener tapes simultaneously with the rows of coupling elements in the above-described embodiment, only a seperable bottom end stop assembly may be molded in the present invention. In such case, for instance, a separable bottom end stop assembly may be molded on a fastener chain to which coiled fastener elements have been attached in the previous process, or after the molding of a separable bottom end stop assembly on fastener tapes, rows of coupling elements may be molded or attached on the fastener tapes in the subsequent process.

What is claimed is:

1. A method of manufacturing a fastener chain including a pair of separable bottom end stop members molded on a pair of continuous fastener tapes comprising the steps of:

(a) intermittently advancing a pair of continuous fastener tapes along a feed path;

(b) attaching a pair of reinforcing films to a pair of separable-bottom-end-stop-member-molding portions of the fastener tapes, respectively;

(c) substantially simultaneously with the reinforcing-film-attaching step (b), forming a pair of positioning holes at a pair of predetermined positions on the reinforcing films, respectively;

(d) thereafter, positioning longitudinal portions of the respective fastener tapes within and relative to a mold using said positioning holes; and (e) finally, injection-molding a pair of separable bottom end stop members on the fastener tapes within said mold.

2. A method according to claim 1, including a step of injection-molding a pair of rows of coupling elements on the fastener tapes simultaneously with a pair of said separable bottom end stop members.

3. A method according to claim 1, between the positioning step (d) and the injection-molding step (e) further including a step of feeding the fastener tapes in a reverse direction by a slight distance to stretch the longitudinal portions of the fastener tapes under a predetermined tension.

4. A method according to claim 1, after the injection-molding step (e) further including a step of using said positioning holes to form a pair of substantially U-shaped cutout portions extending transversely from inner longitudinal edges of the respective fastener tapes to said positioning holes for insertion of the separable bottom end stop members into a box of a separable bottom end stop assembly.

5. An apparatus of manufacturing a fastener chain including a pair of separable bottom end stop members molded on a pair of continuous fastener tapes comprising:

(a) feed means for intermittently advancing a pair of continuous fastener tapes along a feed path;

(b) measuring means disposed in the feed path for measuring a length of travel of the fastener tapes being fed to determine a pair of separable-bottom-end-stop-member-molding portions of the respective fastener tapes;

(c) attaching means disposed downstream of said measuring means for attaching a pair of reinforcing films to the seperable-bottom-end-stop-member-molding portions of the fastener tapes, respectively;

(d) piercing means disposed downstream of said measuring means and operatively interlocked with said attaching means for forming a pair of positioning holes at a pair of predetermined positions on the reinforcing films, respectively;

(e) a molding unit disposed downstream of said piercing means and including a pair of positioning pins receivable in said positioning holes, respectively, of the fastener tapes to position longitudinal portions of the respective fastener tapes within and relative to said molding unit, said molding unit being operable to mold a pair of separable bottom end stop members on the longitudinal portions of the slide fastener tapes; and (f) control means for controlling the operation of said feed means, attaching means, piercing means and molding unit according to information received from said measuring means.

6. An apparatus according to claim 5, including a molding unit being operable to mold a pair of rows of coupling elements on the longitudinal portions of the slide fastener tapes simultaneously with a pair of said separable bottom end stop members.

7. An apparatus according to claim 5, further including second measuring means disposed between said piercing means and said molding unit for measuring a length of travel of the fastener tapes to feed the fastener tapes into said molding unit by a length slightly larger than a predetermined molding length, and reverse feed means for feeding the fastener tapes in a reverse direction to stretch said longitudinal portions of the fastener tapes under a predetermined tension.

8. An apparatus according to claim 5, further including cutting means disposed downstream of said molding unit for cutting out a portion of the fastener tapes using the positioning holes of the fastener tapes so as to form a pair of substantially U-shaped cutout portions extending transversely from inner longitudinal edges of the respective fastener tapes to said positioning holes for insertion of the separable bottom end stop members into a box of a separable bottom end stop assembly.

9. An apparatus according to claim 7, wherein said reverse feed means includes tape clamping means disposed upstream of said second measuring means for clamping the fastener tapes to prevent said longitudinal portions of the fastener tapes from moving in said reverse direction beyond said tape clamping means, and tape pullback means disposed between said tape clamping means and said second measuring means for pulling said longitudinal portions of the fastener tapes in said reverse direction.

10. An apparatus according to claim 7, wherein said molding unit is composed of a pair of mold members relatively movable toward and away from each other and having confronting mold surfaces, said positioning pins being spring-loaded and normally projecting the mold surface of one of said pair of mold members, the other of said pair of mold members having a pair of pin-receiving holes receptive of said positioning pins, respectively.

11. An apparatus according to claim 9, wherein said tape pullback means includes a pullback bar reciprocally movable in a direction perpendicular to the plane of the fastener tapes to bend the fastener tapes into a substantially V-shaped configuration between said tape clamping means and said second measuring means.

12. An apparatus according to claim 10, wherein further including a pair of proximity switches disposed in said pin-receiving holes, respectively, and adapted to be activated by said positioning pins when the positioning pins are received in the corresponding pin-receiving holes, said proximity switches being operatively connected to said control means for controlling operation of said reverse feed means via said control means.

* * * * *